(12) United States Patent
Elliott

(10) Patent No.: US 8,625,598 B2
(45) Date of Patent: Jan. 7, 2014

(54) PACKET HEADER COMPRESSION FOR LOSSY CHANNELS

(75) Inventor: Brig Barnum Elliott, Arlington, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 190 days.

(21) Appl. No.: 13/178,907

(22) Filed: Jul. 8, 2011

(65) Prior Publication Data

US 2011/0271012 A1    Nov. 3, 2011

Related U.S. Application Data

(63) Continuation of application No. 12/570,919, filed on Sep. 30, 2009, now Pat. No. 7,986,719, which is a continuation of application No. 10/803,002, filed on Mar. 17, 2004, now Pat. No. 7,613,185.

(51) Int. Cl.
*H04L 12/28* (2006.01)

(52) U.S. Cl.
USPC .......................................... 370/392; 709/247

(58) Field of Classification Search
None
See application file for complete search history.

(56) References Cited

U.S. PATENT DOCUMENTS

| | | |
|---|---|---|
| 5,535,199 A | 7/1996 | Amri et al. |
| 6,032,197 A | 2/2000 | Birdwell et al. |
| 6,300,887 B1 | 10/2001 | Le |
| 6,882,637 B1 | 4/2005 | Le et al. |
| 6,914,903 B1 | 7/2005 | Miyazaki et al. |
| 6,967,964 B1 | 11/2005 | Svanbro et al. |
| 2002/0018010 A1* | 2/2002 | Le .................................. 341/60 |
| 2002/0059462 A1* | 5/2002 | Hannu et al. .................. 709/247 |
| 2002/0059464 A1 | 5/2002 | Hata et al. |
| 2004/0103277 A1 | 5/2004 | Seada et al. |
| 2004/0125817 A1* | 7/2004 | Miyazaki et al. ............. 370/411 |
| 2004/0136377 A1 | 7/2004 | Miyazaki et al. |
| 2005/0083944 A1 | 4/2005 | Liu et al. |

* cited by examiner

*Primary Examiner* — David Oveissi

(57) ABSTRACT

The disclosed systems and methods provide for the compression and decompression of packet headers. An uncompressed header can be compressed in size to form a smaller, compressed header, such that the compressed header can include values that can be used to re-produce the uncompressed header. A compressed header can include at least two such values. A first value of the at least two values can be computed based on a second, earlier uncompressed header and can be used to derive the uncompressed header. Similarly, a second value of the at least two values can be computed based on a third uncompressed header and can be used to derive the same uncompressed header. Accordingly, the uncompressed header can be derived based on the first value and the second uncompressed header, or based on the second value and the third uncompressed header. The uncompressed header, second uncompressed header, and third uncompressed header can be associated with different packets.

28 Claims, 9 Drawing Sheets

PACKET HEADER COMPRESSION FOR LOSSY CHANNELS

CROSS REFERENCE TO RELATED APPLICATIONS

This application is a continuation of co-pending parent U.S. patent application Ser. No. 12/570,919, filed on Sep. 30, 2009 which, in turn, is a continuation of grandparent U.S. patent application Ser. No. 10/803,002, filed on Mar. 17, 2004 and which issued on Nov. 3, 2009 as U.S. Pat. No. 7,613,185, the contents of both of which being expressly incorporated herein by reference. Benefits under 35 U.S.C §120 are hereby claimed.

BACKGROUND (1) Field

The disclosed methods and systems relate generally to compression of packet headers, and more particularly to packet header compression for lossy channels.

(2) Description of Relevant Art

There is a continuing interest in improving the performance of packet-based networks to handle ever-growing demands on the capability of such networks to carry larger capacities of data. Such packet-based networks comprise intricate inter-connections of network devices that operate based on a diverse collection of protocols that define and control the overall operation of the network. These networking protocols require that data carried over the networks be accompanied by control information, which are often quite extensive and can place non-negligible demands on network resources. Thus, one continuing effort to improve network performance is known as "header compression" and involves encoding and/or condensing network protocol control information to decrease the network resources required by such protocols and to allow the networks to handle greater proportions of data.

In general, a packet contains a control portion (the header) that includes various fields that indicate the manner in which the packet should be handled, and a data portion (the payload) that stores the data being transmitted, such as e-mail data, text messages, voice audio, pictures, or video data. It is possible to compress a packet header because there is often significant redundancy between header fields, both within the same packet and between consecutive packets that are part of the same packet stream. For example, with respect to Transmission Control Protocol (TCP) and Internet Protocol (IP), a header compression method described by V. Jacobson in RFC 1144 indicates that for TCP/IP headers, half of a header is likely to remain constant between consecutive packets in a packet stream. Accordingly, a reduction of one-half in the size of a TCP/IP header can be realized by storing a copy of the latest packet header for a packet stream at a receiver and transmitting to the receiver only the variable portion of a subsequent packet header. The method of Jacobson further compresses a TCP/IP header by realizing that the variable portions often change slowly or minutely. Thus, transmitting the amount of change (called "delta") rather than the value of the variable portion can result in a further reduction in header size. A receiver can apply a received delta to the variable portion of an uncompressed packet header to produce the variable portion of the next header. The constant portion of this next header can be obtained from the constant portion of the uncompressed header.

As exemplified by the header compression method of Jacobson, a "compressed header" is generally a condensed and/or encoded version of a full packet header. Thus, an individual compressed header in a packet does not convey the same extent of control information as a full header and must rely on a context provided by previous header(s) to derive control information. There are, however, situations where such context may be unavailable. For example, it is commonly known that packets may be re-ordered prior to arrival at a receiver. Because a header is compressed based on a previous header, packet re-ordering prior to decompression may cause a context of previous packets to be unavailable and can result in delays and/or other complications at the receiver. In addition, poor transmission conditions may cause certain packets to be lost, which results in decompression errors if a receiver does not recognize the packet loss and continues to apply received deltas to other packets in place of the lost packets. However, even when a receiver recognizes that re-ordering or packet loss has occurred, it may still be unable to accommodate subsequent packets and may require the transmitter to re-send the lost and/or subsequent packets. Thus, there is a continuing interest in improving header compression technology to accommodate problems such as packet re-ordering and packet loss.

SUMMARY

The disclosed systems and methods provide for the compression and decompression of packet headers. An uncompressed packet can include an uncompressed header structured according to a networking protocol, such as Internet Protocol, Transmission Control Protocol, User Datagram Protocol, and Real-Time Protocol, among others. An uncompressed header can be compressed in size to form a smaller, compressed header, such that the compressed header can include values that can be used to re-produce the uncompressed header based on preceding headers. In one embodiment, a compressed header can include at least two such values. A first value of the at least two values can be used to derive the uncompressed header based on a second, earlier uncompressed header. Similarly, a second value of the at least two values can be used to derive the uncompressed header based on a third uncompressed header. Accordingly, the uncompressed header can be derived based on the first value and the second uncompressed header, or based on the second value and the third uncompressed header.

In one embodiment, the first value can be computed based on the uncompressed header and the second uncompressed header, such that the first value corresponds to a difference between a value representative of a portion of the uncompressed header and a value representative of a corresponding portion of the second uncompressed header. Similarly, the second value can be computed based on the uncompressed header and the third uncompressed header, such that the second value corresponds to the difference between a value representative of a portion of the uncompressed header and a value representative of a corresponding portion of the third uncompressed header. The first and second values can be can encoded by a variable-length code and/or a sign-based code.

In one embodiment, the uncompressed header, the second uncompressed header, and the third uncompressed header can be associated with different packets. The packets associated with the second and third uncompressed headers can be consecutive packets. In one embodiment, the at least two values in the compressed header can include other values, in addition to the first and second values, that are associated with other packets distinct from those associated with the second and third uncompressed headers. In one embodiment, a compressed header can include a destination address, a packet sequence number, and/or a packet stream identifier number.

In one embodiment, the uncompressed header can be maintained at a first (e.g., source) network node, and the second and/or third uncompressed headers can be maintained at a second (e.g., destination) network node. A packet containing a compressed version of the uncompressed header can be transmitted from the first network node and received by the second network node, where the compressed header can include a first value and a second value for deriving the uncompressed header at the second network node based on the second uncompressed header or the third uncompressed header, respectively. In one embodiment, the uncompressed header can be derived at the second network node by summing the first value with the second uncompressed header and/or summing the second value with the third uncompressed header. The packet can traverse a connection from the first node to the second node that includes no intervening nodes, or the packet can traverse a connection that includes one or more intervening nodes.

More generally, a compressed version of an uncompressed header can include a plurality of values for deriving the uncompressed header. The plurality of values can be generated by computing, for each of at least two uncompressed headers associated with previously transmitted packets, a corresponding value for deriving the uncompressed header. The uncompressed headers associated with the previous packets can be stored and updated to include new uncompressed headers associated with newly transmitted packets.

Other objects and advantages will become apparent hereinafter in view of the specification and drawings.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

The disclosed systems and methods provide for managing compression and decompression of packet headers in a manner that accommodates packet re-ordering and packet loss, among other things. Data such as e-mail, text messages, voice audio, digital music and pictures, video, etc., can be carried in a network according to networking protocols that apportion the data into segments and append one or more headers to those segments. The headers contain control information that facilitate the handling and delivery of the data segments and are structured according to defined arrangements. As used herein, a header that is structured according to an arrangement defined by a networking protocol can be understood to be an "uncompressed header." In contrast, a header that is a condensed and/or encoded version of an uncompressed header can be understood to be a "compressed header." The disclosed systems and methods provide for compressing an uncompressed header based on a number of other uncompressed headers such that the uncompressed header can be re-produced using one of the other uncompressed headers.

Figure 1:
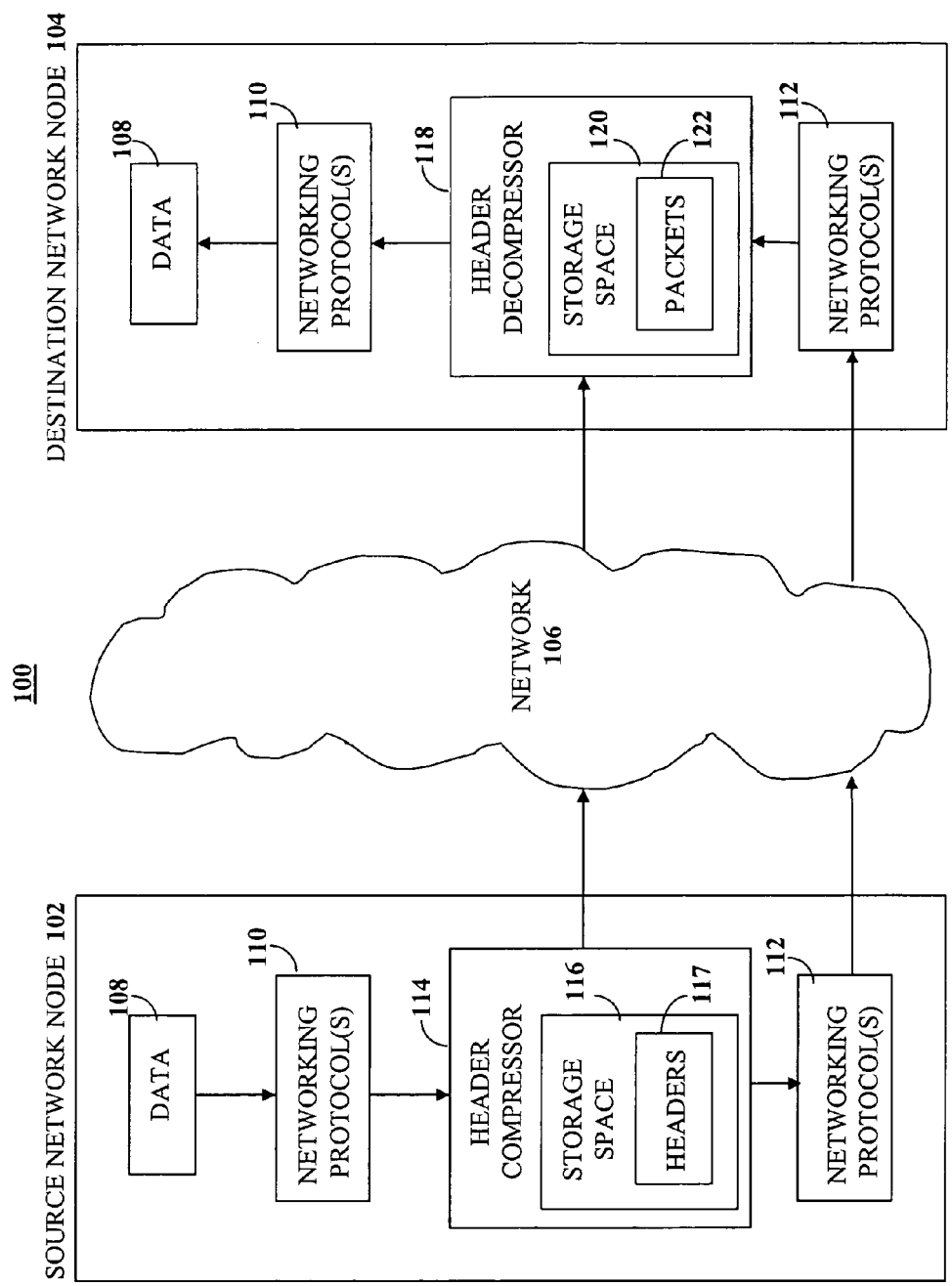
FIG. 1 is a diagram of an exemplary network architecture employing header compression/decompression.

Referring now to FIG. 1, there is shown an exemplary network artichecture 100 having a source network node 102 and a destination network node 104 in communication with a network 106. For the described methods and systems, the network 106 can be a physically connected network having devices connected by physical connection medium, such as copper wire, twisted-pair, coaxial cable, fiber-optics, USB cable, firewire, etc., and/or a wirelessly connected network having devices that employ wireless technologies such as Bluetooth, 802.11b/g, GSM/GPRS, etc. The network 106 can encompass a myriad of network configurations and devices, ranging from a simple cable locally connecting the source node to the destination node to a complex inter-connection of wireline and/or wireless network nodes. As used herein, a network node can be understood to be a device, or portion thereof, that interacts with and/or forms a part of a network, such a PC, workstation, laptop, PDA, modem, NIC, cellular telephone, router, hub, switch, etc. Although the source and destination network nodes 102, 104 are illustrated as being separate from the network 106, the nodes 102, 104 perform networking operations and are, in reality, encompassed within and/or part of the network 106.

As previously provided herein, a network 106 manages delivery of data 108 according to networking protocols 110, 112, such as Internet Protocol (IP), Transmission Control Protocol (TCP), User Datagram Protocol (UDP), and Real-Time Protocol (RTP), among others. A network node 102, 104 operating in accordance with one or more networking protocols 110, 112 can implement the protocols using hardware components, such as digital circuitry, and/or using software instructions executing on a processor. As shown in FIG. 1, data 108 located at the source network node 102 can be processed by a cascade of one or more networking protocols 110, 112 and a header compressor 114 to produce packets (not shown) to carry the data 108 across the network 106. The compressor 114 can include a storage space 116 for maintaining information such as compressor configuration and/or a history of one or more transmitted headers 117. Packets that traverse the network 106 may encounter conditions that result in some packets being re-ordered or completely lost. The packets that are received at the destination network node 104 can be accepted or discarded by the networking protocols 112 and/or the header decompressor 118 based on the extent and severity of the packet re-ordering and/or loss. Considerations for determining whether to process or discard received headers will be described herein. The decompressor 118 can include a storage space 120 for maintaining information such as decompressor configuration and/or a history of one or more decompressed packets 122. Decompressed packets 122 can be further processed by networking schemes to re-assemble the original data 108 at the destination node 104.

The illustrated architecture and components in FIG. 1 are exemplary and do not limit the scope of the described technology. Other configurations and arrangements are contemplated and include, for example, multiple header compressors/decompressors at the source and destination network nodes 102, 104. Further, those of ordinary skill will recognize that packets that are successfully decompressed at the destination node 104 may need to be compressed again and transmitted to another network node. Accordingly, although the network nodes 102, 104 are singularly designated as a source or destination node, it is understood that a network node can concurrently operate as both a source node and a destination node and can perform header compression and decompression. Additionally, the illustrated storage spaces 116, 120 can be physically located internal or external to the compressor 114/decompressor 118.

Figure 2A:
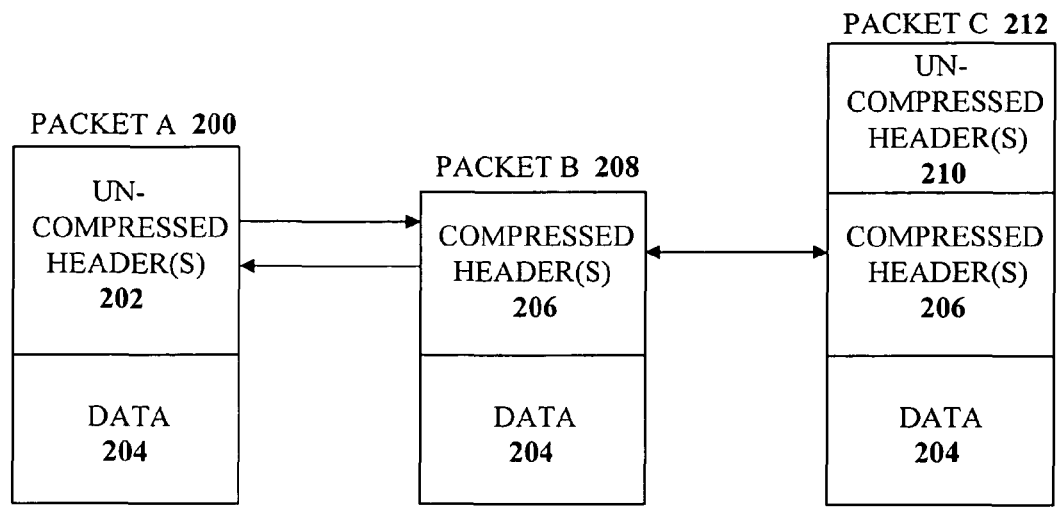
FIGS. 2A-2C are diagrams of exemplary packets having compressed headers and/or uncompressed headers.

Now with reference to FIG. 2A, there is shown a packet A 200 containing an uncompressed header 202 and a data segment 204. The uncompressed header 202 can be condensed and/or encoded to form a compressed header 206 that is reduced in size when compared to the uncompressed header 202. The compressed header 206 can include all or a portion of the uncompressed header 202 in encoded form, and can also include a duplicate of a portion of the uncompressed header 202. Additionally, a compressor 114/decompressor 118 can also convey header compression control information (not shown) in the compressed header 206. After header compression, a packet B 208 containing the compressed header 206 and data segment 204 can be transmitted to the network 106 if no additional networking protocols wait to process the packet. Otherwise, one or more additional networking protocol headers 210 can be coupled to packet B 208 to form a packet C 212, which can then be transmitted to the network 106.

Figure 2B:
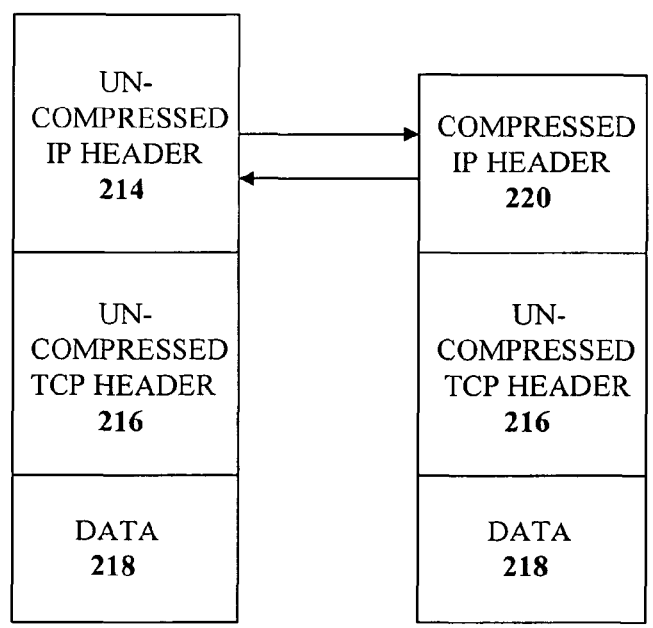
Figure 2C:
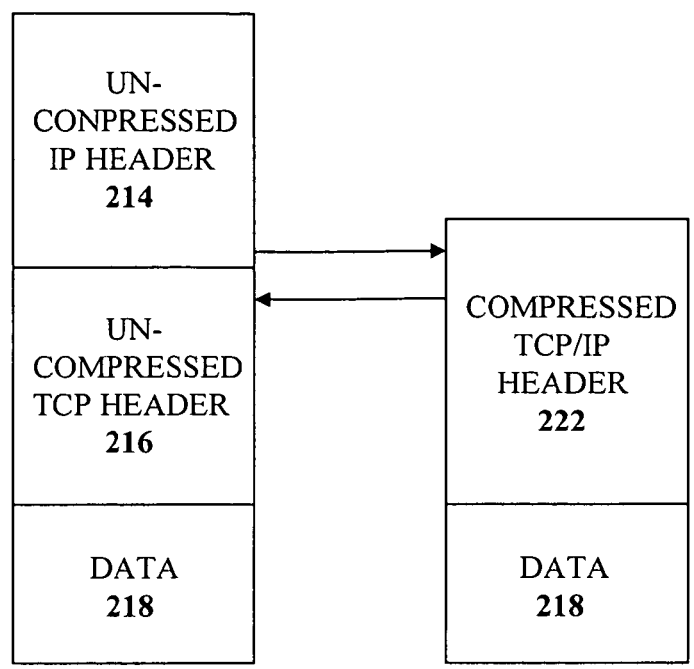

In one embodiment, an uncompressed packet may contain more than one uncompressed header, and a compressor can designate a subset of the headers for compression. For example, shown in FIG. 2B is a header compression scheme based on TCP and IP headers. The uncompressed packet comprises an uncompressed IP header 214, an uncompressed TCP header 216, and a data segment 218. TCP provides useful network services that a network may wish to utilize so that in one embodiment, the TCP header 216 can be maintained in uncompressed form. Accordingly, a compressor can be designed to recognize TCP and IP header structures 214, 216 and can compress only the IP header 220 while leaving the TCP header 216 uncompressed. Alternatively, in one embodiment, multiple uncompressed headers can be condensed and/or encoded into a single compressed header. As shown in FIG. 2C, a TCP header 216 and an IP header 214 can be compressed to form a single compressed header 222.

The illustrated structures and arrangements of compressed and uncompressed packets in FIGS. 2A-2C are exemplary embodiments, and other combinations of one or more compressed and/or uncompressed headers within a packet are also contemplated to be included within the scope of the disclosed systems and methods.

Figure 3:
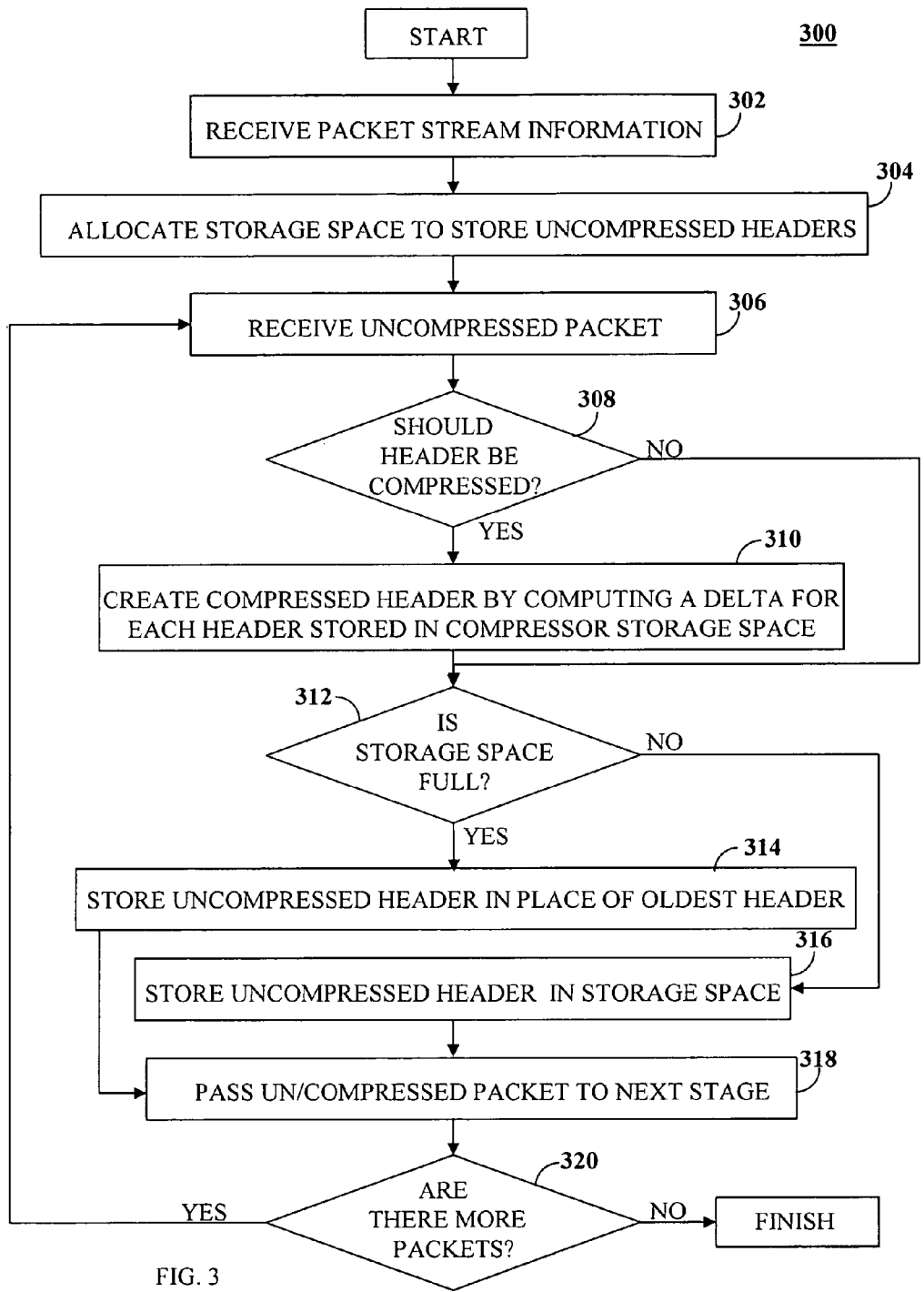
FIG. 3 is a flow chart of an exemplary method of operating a compressor to receive and compress packet headers in a packet stream.

Now with reference to FIG. 3, there is shown a flow chart 300 of a method of operating a compressor to receive and compress packet headers in a packet stream. Also with continuing reference to FIGS. 1 and 2A, a packet 200 arriving at a compressor 114 has an associated packet stream that determines the networking protocol headers 202 used by that stream. Accordingly, packets that are associated with the same packet stream contain the same types and arrangement of headers. In one embodiment, a compressor 114 can receive information regarding a packet stream (302) prior to receiving packets from that stream. The information can specify, for example, the order and type of networking protocol headers in a packet, thereby allowing the compressor 114 to properly service the packet stream. In one embodiment, a compressor 114 can allocate storage space 116 (304) for storing a history of uncompressed packet headers 117 from a packet stream. For the sake of simplicity for this example, it is assumed that each packet contains a single uncompressed header 202 and a data segment 204, although the disclosed methods are not limited by such assumption.

Upon receiving an uncompressed packet 200 (306), a compressor 114 can identify the packet stream associated with the packet 200 and can determine whether the header 202 should be compressed (308) based on, for example, whether the decompressor 118 may need to receive an uncompressed header 202 for use as a reference. For example, a packet header 202 can remain uncompressed so that when it is received at the decompressor 118 at a destination node 104, it can serve as a reference/starting point for decompressing subsequently received headers. Accordingly, the first packet or a number of first packets in a packet stream can remain uncompressed. Before transmitting an uncompressed packet 200 to another networking protocol 112 or to the network 106, the compressor 114 can store the uncompressed header 202 in the allocated storage space 116 to maintain a history of uncompressed headers 117 for a packet stream. The compressor 114 can determine whether the allocated storage space 116 is full (312), and if not, can store the uncompressed header 202 in an available location in the storage space 116 (316). Otherwise, the compressor 114 can store the uncompressed header 202 in the storage space 116 in place of the oldest header in the storage space 116 (314). In this manner, the storage space 116 can maintain a history of the most recent packet headers 117. After passing the uncompressed packet 200 to the next stage (318), the compressor 114 can determine if the packet stream is complete or if there are more packets to receive and process (320). The compressor 114 can terminate servicing of a packet stream when there are no more packets to receive.

Other than those situations for which a packet header may remain uncompressed, a compressor 114 can perform header compression in a manner that provides some amount of tolerance for packet re-ordering and/or loss. In one embodiment, the compressor 114 can compute, for each stored header 117 in the storage space 116, a corresponding value (such as a delta) from which the uncompressed header 202 can be derived using the corresponding stored header (310). These values can be included together in a compressed header 206 and can be used by a decompressor 118 to re-produce the uncompressed header 202 using one of the corresponding headers 117 that was also decompressed and stored 122 at the decompressor 118. Accordingly, a compressed packet 208 can be decompressed at a decompressor 118 if at least one packet 117 on which its compression is based was also received and decompressed. In one embodiment, a subset of less than all of the headers 117 stored in the compressor storage space 116 can be used in the compression process, where the headers in the subset can be consecutive or non-consecutive. Before transmitting the compressed packet 208 to another networking protocol 112 or to the network 106, the compressor 114 can store the corresponding uncompressed header 202 in the allocated storage space 116 to maintain a history of uncompressed headers 117 for a packet stream. As previously provided, the compressor 114 can determine whether the allocated storage space 116 is full (312), and if not, can store the uncompressed header 202 (316) in an available location in the storage space 116. Otherwise, the compressor 114 can store the uncompressed header 202 in the storage space 116 in place of the oldest header in the storage space 116 (314). In this manner, the storage space 116 can maintain a history of the most recent packet headers 117. After passing the compressed packet 208 to the next stage (318), the compressor 114 can determine if the packet stream is complete or if there are more packets to receive and process (320). The compressor 114 can terminate servicing of a packet stream when there are no more packets to receive.

Figure 4:
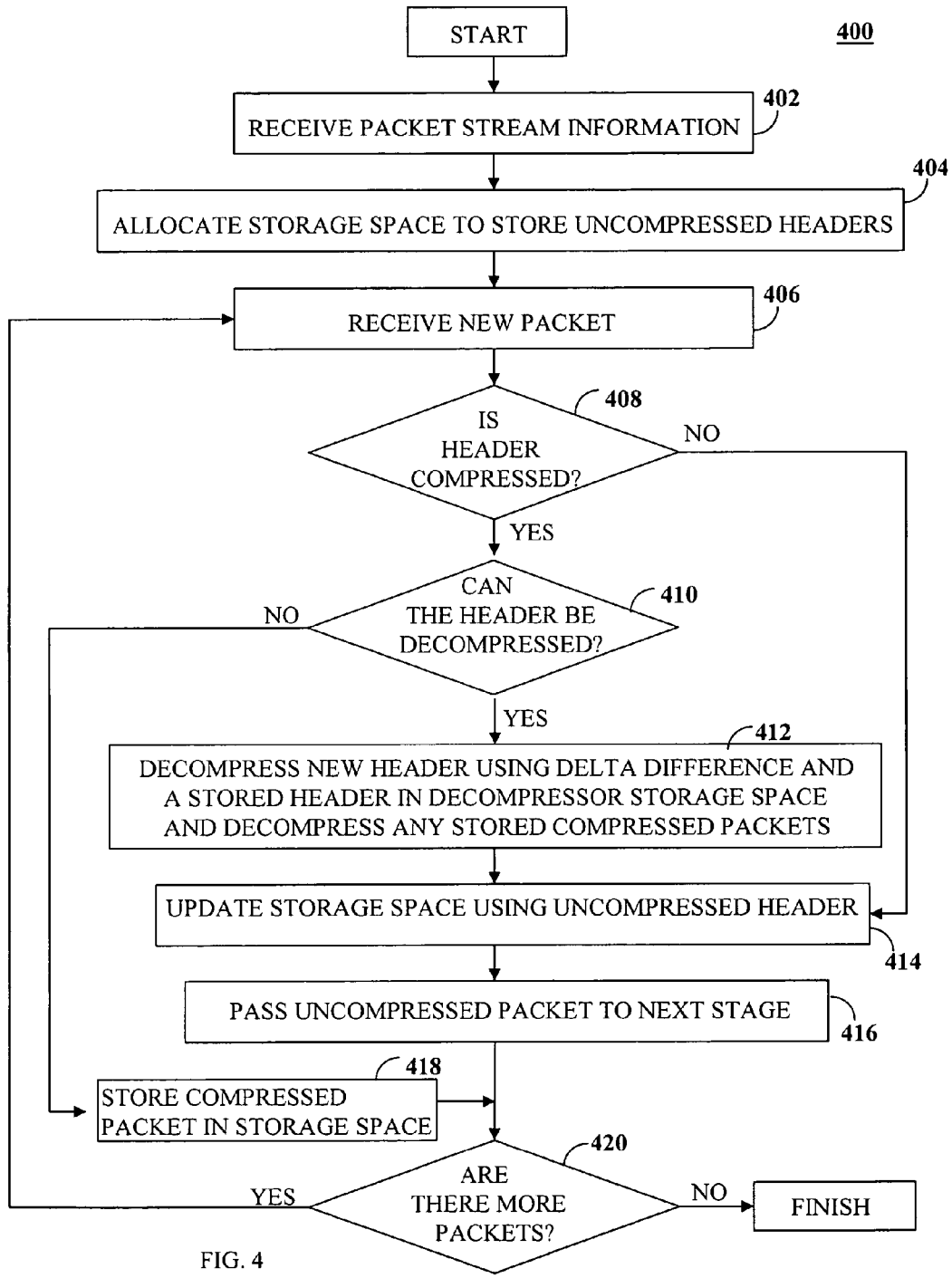
FIG. 4 is a flow chart of an exemplary method of operating a decompressor to receive and decompress compressed packet headers in a packet stream.

Referring now to FIG. 4, there is shown a flow chart 400 of a method of operating a decompressor 118 to receive and decompress packet headers in a packet stream. With continuing reference to FIGS. 1 and 2A, a decompressor 118 can receive information regarding a packet stream (402) prior to receiving packets from that stream. Upon receiving packet stream information, a decompressor 118 can allocate storage space 120 (404) for storing a history of decompressed packet headers 122. For the sake of simplicity for the present example, it is assumed that each packet contains a single header (compressed 206 or uncompressed 202) and a data segment 204, although the disclosed methods are not limited by such assumption.

Upon receiving a packet (406), a decompressor 118 can identify the packet stream associated with the packet and can determine whether the header is compressed (408). If the header is not compressed 202, the decompressor 118 can use the uncompressed header 202 to update the storage space 120 (414). For example, the uncompressed header 202 can be stored in the storage space 120 if it is more recent than at least one other packet 122 in the storage space 120. If the header is compressed 206, the decompressor 118 can examine the compressed header 206 to identify the headers 117 on which the compression is based. The decompressor 118 can determine whether the compressed header 206 can be decompressed (410) by determining if another of the headers 117 on which the compression is based correspond to decompressed and stored headers 122 in the storage space 120. The decompressor 118 can derive the uncompressed header 202 by applying a computed value (e.g., delta difference) in the compressed header 206 to a corresponding header 122 in the storage space 120 (412). The uncompressed header 202 can be used to update the storage space 120 (414) before being provided to the next stage (e.g., another networking protocol) (416) in the destination node 104. If the compressed header 206 cannot be decompressed, then the compressed packet 208 can be temporarily stored in the storage space 120 (418) until subsequent packets are received and decompressed, which may allow the stored compressed headers to be decompressed. For example, a decompressor 118 can decompress newly received packets and, using those decompressed packets, can decompress another stored compressed packets (412). After processing a received packet, the decompressor 118 can determine if the packet stream is complete or if there are more packets to receive in the stream (420). The decompressor 118 can complete servicing of the packet stream when there are no more packets to receive.

With respect to the compressor/decompressor storage spaces 116, 120, the amount of space to allocate for storing packet headers 117, 122 can depend upon several considerations, such as the nature of noise interference affecting packets and the amount of variation between packet header content. For example, if noise interference in the network is pulsed and, on average, has a particular pulse duration, then storage space 116, 120 can be allocated to maintain a number of consecutive headers 117, 122 that span a transmission duration longer than the average pulse duration. A compression scheme based on compressing against each of the consecutive headers 117 would thus be able to endure an average level of interference and packet loss. One disadvantage is that the number of consecutive headers 117, 122 to store may be large, and a compression scheme using every one of the consecutive headers can result in a compressed header 206 that is greater in size than the uncompressed header 202. However, if the nature of the packet stream is such that packet header contents vary slowly, then a header 202 can be compressed using every other (or fewer than every other) header in the storage space 116. The compressed header 206 can thus be reduced in size by allowing delta values to remain small, while still accommodating an average level of interference and packet loss.

The particular sizes of the compressor/decompressor storage spaces 116, 120 and the number and selection of stored headers 117 to use in a compression scheme are thus variable and can be designed according to the needs and considerations of the embodiment. The following sections will describe a particular compressor/decompressor design. However, the described design is exemplary and non-limiting, and variations and modifications are contemplated to be included within the scope of the disclosed systems and methods.

Figure 5:
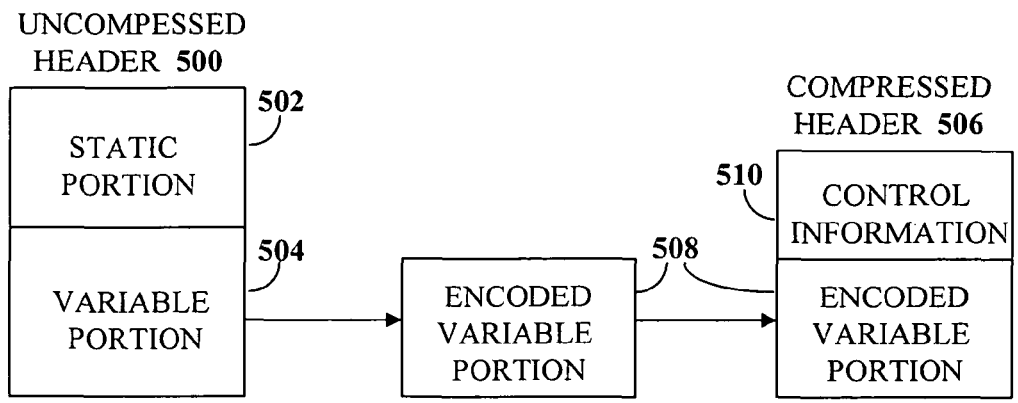
FIG. 5 is a diagram of the exemplary portions of an uncompressed header and a compressed header.

Referring now to FIG. 5, there is shown an embodiment of an uncompressed header 500 having a static portion 502 and a variable portion 504. A static portion 502 can be understood to include those fields of the header 500 that are unchanged for all packets in a packet stream. In contrast, the variable portion 504 includes those fields that vary between packets in a packet stream. The static portion 502 can additionally include header fields that may be variable, but whose values can be inferred from the variable portion 504 or from the headers of other networking protocols. The static portion 502 of a header needs to be received by the decompressor only once and can be conveyed to the decompressor in an uncompressed header 500. As an example, as Bormann, et al. describe in RFC 3095, an Internet Protocol (IP) header has a number of fields that include a source address field, a destination address field, a packet length field, and a time to live field. The source and destination address fields must be constant for all packets in a stream and thus are included in the static portion 502 of an IP header. In contrast, the time to live field can vary between packets and is included in the variable portion 504. While the packet length field is not constant, it can be considered part of the static portion 502 because packet length fields also exist in other networking protocol headers (such as link layer headers) that are attached to an IP header. Thus, the packet length field in an IP header can be inferred from the packet length fields of other networking protocols and need not be included in a compressed IP header. Although the static and variable portions 502, 504 are each illustrated as being contiguous segments, they can include one or more non-neighboring header fields and can also be non-contiguous.

The variable portion 504 can be included in a compressed header 506 in original form (not shown) or in encoded form 508, which in most cases is lesser in size than the original form. For example, the values in the variable portion 504 of a header 500 can be encoded by computing delta differences with respect to the variable portions of preceding packet headers 117 stored in a compressor storage space 116. If the variable portion varies slowly, then the delta value can be smaller than the value of the variable portion. Since a delta can be positive or negative, it can be encoded using a sign-based code such as twos complement. In addition, the delta can also be encoded based on frequency of occurrence using a variable-length code such as a Huffman code. A compressed header 506 can also include control information 510 in addition to the encoded variable portion 508. The control information 510 can, for example, specify a sequence number to convey packet order and/or an indicator to convey whether a header is compressed or uncompressed.

Figure 6:
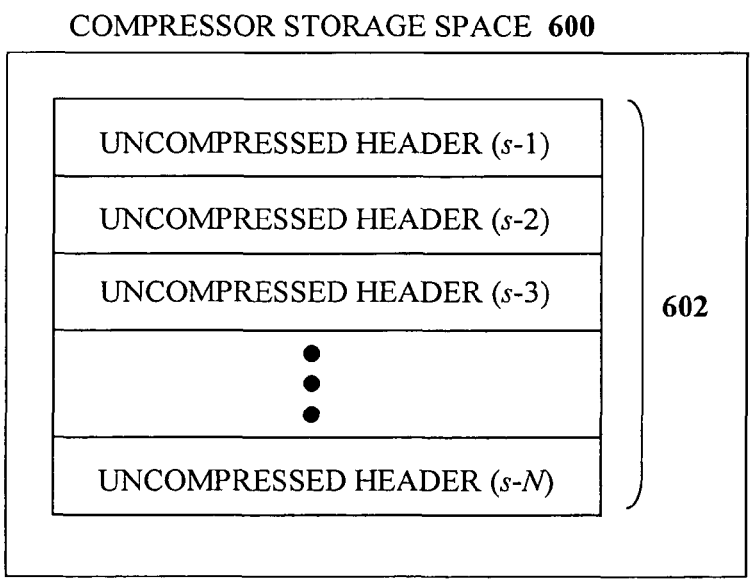
FIG. 6 is a diagram of an exemplary compressor storage space from which encoded header values can be computed.

Referring now to FIG. 6, there is shown an exemplary compressor storage space 600 containing uncompressed packet headers 602. The stored packet headers 602 can include both the static and variable portions of a header or can include only the variable portion. In the illustrated embodiment, the storage space 600 is allocated to maintain a history of N packet headers 602, where N is two or greater and can be selected based on an average noise interference duration. Accordingly, the storage space 600 can maintain a history of the N most recent uncompressed packet headers. In one embodiment, a new header can be inserted into one end of the storage space while the oldest header can be discarded from the other end. In this manner, the storage space 600 need not store the sequence numbers of the packet headers because the N packet headers 602 remain in order from newest to oldest. In general, it can be inferred that if a header to be compressed has sequence number s, then the newest stored header has sequence number (s−1) and the oldest stored header has sequence number (s−N). If there are less than N stored headers in the storage space 600, then the oldest header has sequence number "one". Although the compressor storage space 600 as illustrated includes only uncompressed packet headers 602, the storage space 600 can also include sequence numbers and other information in addition to packet headers.

Figure 7:
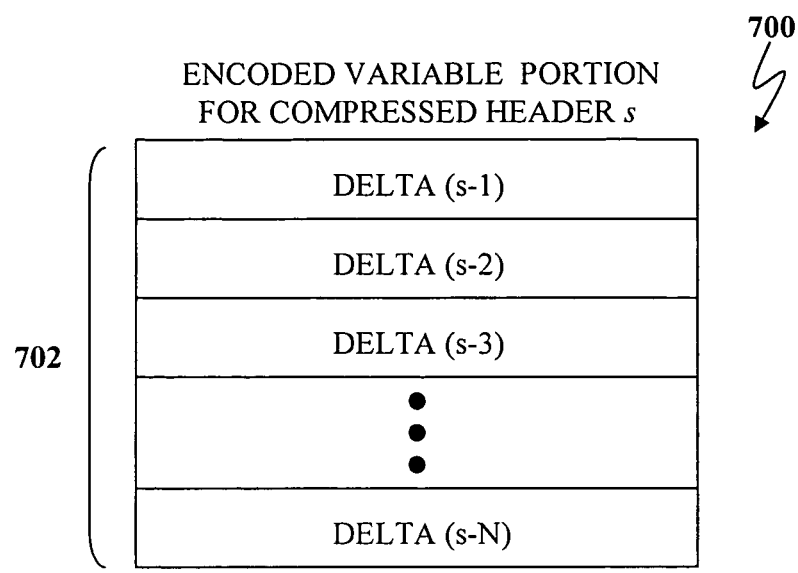
FIG. 7 is a diagram of an exemplary encoded portion of a compressed header.

With continuing reference to FIG. 5, in one embodiment, a compressor can encode an uncompressed header 500 by computing delta differences between the variable portion 504 of the uncompressed header 500 and the variable portions of the stored headers 602. With reference also to FIG. 7, there is shown an encoded variable portion 700 of a compressed header s that includes a delta value 702 for each stored header 602 in the storage space 600, where delta (s−1) corresponds to the difference between the variable portion of header s and the variable portion of uncompressed header (s−1), and so on for delta (s−2) through delta (s−N). The delta values 702 can be represented using a signed, variable-length code or a fixed-length code. The length of such a code can depend on the range of values that a delta can assume. Additionally, the length of a variable-length code can depend on the probabilistic distribution of the range of delta values.

Figure 8A:
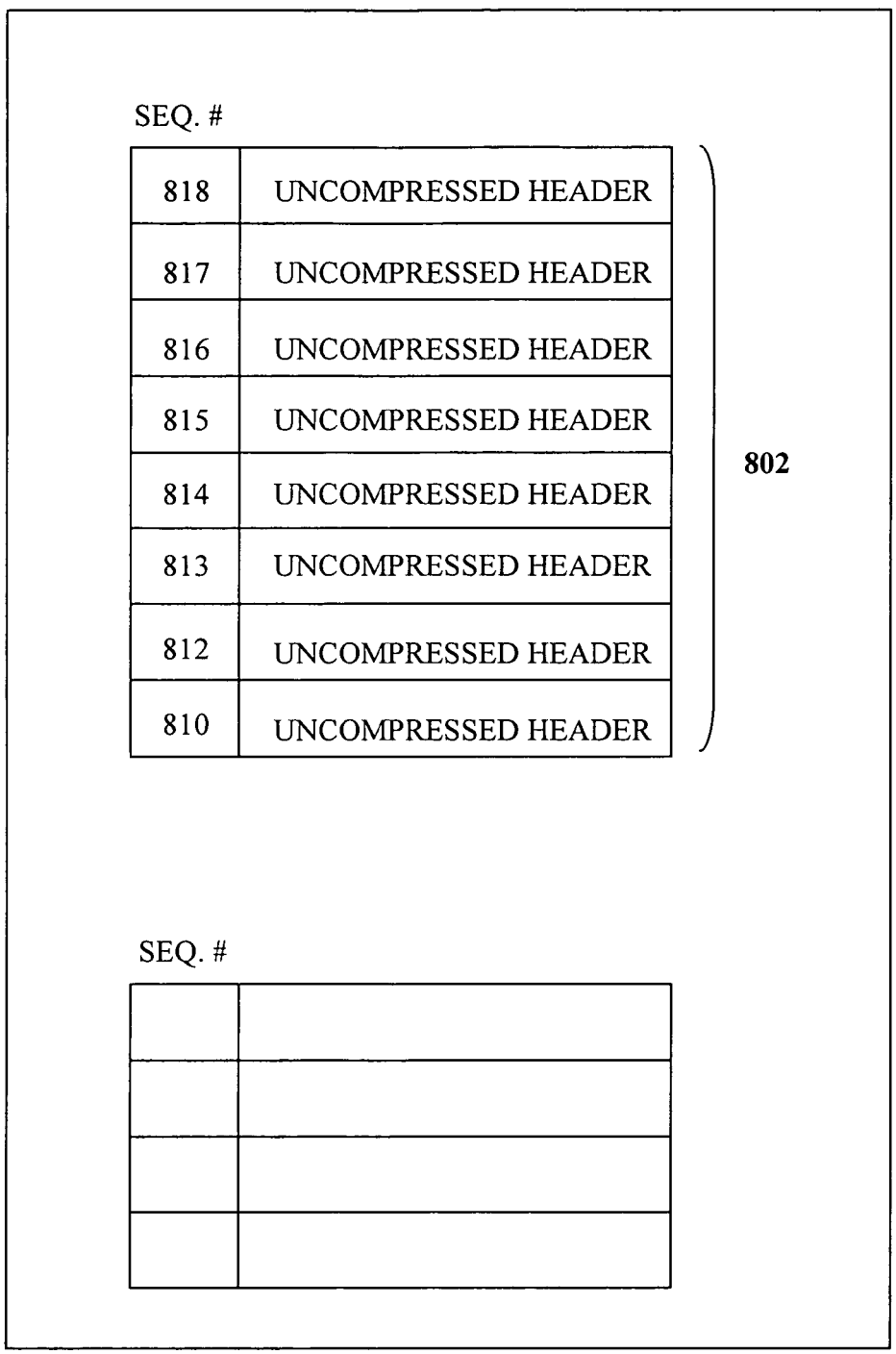
FIGS. 8A-8B are diagrams of an exemplary decompressor storage space containing decompressed headers and compressed headers waiting to be decompressed.

With reference to FIG. 8A, there is shown an exemplary decompressor storage space 800 containing received headers that have been decompressed 802. In one embodiment, storage space 800 can be allocated to maintain N decompressed headers 802. For example, the number N of stored headers can equal eight so that the decompressor storage space 800 maintains the eight most recently decompressed headers. The most recently decompressed headers 802 may not have consecutive sequence numbers since packets may be received out of order or may not be received at all. As shown in FIG. 8A, while header 810 is the oldest decompressed header in the storage space 800, header eight-hundred eleven, a later header, is absent from the list. Referring again to the delta values 702 of FIG. 7 with N equal to eight, a compressed packet header 700 can be decompressed by applying one of the delta values 702 to a corresponding one of eight preceding headers 602. Stated another way, an uncompressed header with sequence number s can be used to decompress headers (s+1) through (s+8). Accordingly, stored header 810 in FIG. 8A can be used to decompress header eight-hundred eleven, and stored header 818 can be used to decompress headers eight-hundred nineteen through eight-hundred twenty-six.

Figure 8B:
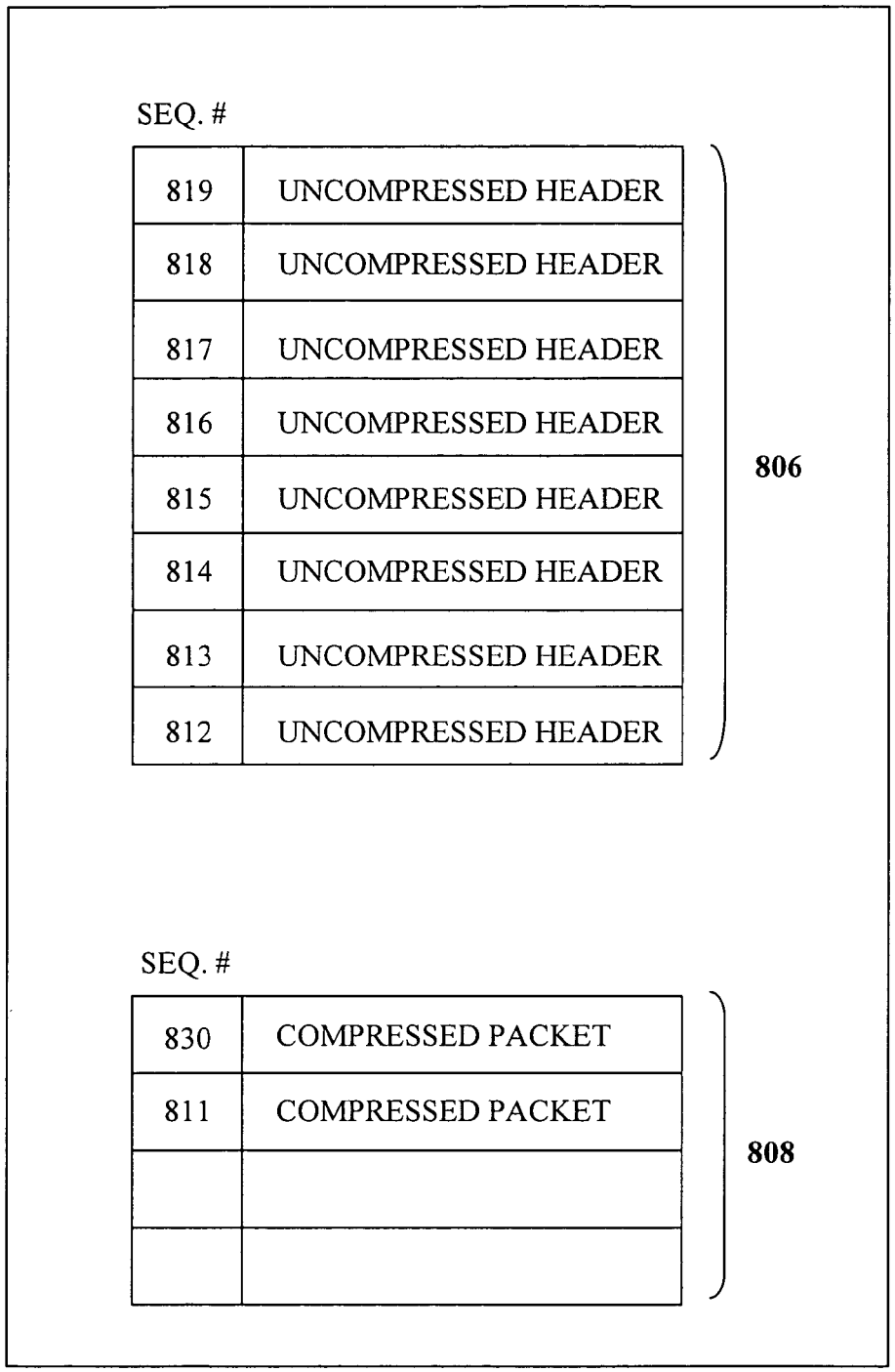

The decompressor storage space 800 can be updated when a newly received header is decompressed. Suppose that a decompressor having the storage space 800 shown in FIG. 8A receives compressed headers 819, 830, and 811, in that order. The decompressor is able to derive uncompressed header 819 based on stored header 818 and can store uncompressed header 819 in the storage space as the newest header. In the process, the oldest header 810 is discarded, resulting in the stored headers 806 of the updated storage space 804 of FIG. 8B. The decompressor also receives compressed headers 830 and 811 but is unable to decompress them because the storage space 804 lacks the necessary headers. In one embodiment, compressed packets 808 that have been received but that cannot be decompressed can also be stored in the storage space 804. Thus, compressed headers 830 and 811 can be stored in the storage space 804 while they wait to be decompressed. Compressed header 830 can be decompressed based on whether another of headers eight-hundred twenty-two through eight-hundred twenty-nine are received and decompressed. However, based on the uncompressed headers 806 in the storage space 804 of FIG. 8B, compressed header 811 cannot be decompressed regardless of which other compressed headers are received. Compressed headers that arrive with sequence numbers less than 811 also cannot be decompressed, and headers that arrive with sequence numbers greater than 811 cannot be used to decompress header 811.

In one embodiment, the situation of stored compressed packets 808 that cannot be decompressed can be mitigated by storing every other (or fewer than every other) decompressed header 806 in the decompressor storage space 804. For example, a decompressor can store every other N header in the storage space 804. Since a stored header s can be used to decompress headers (s+1) through (s+N), this storage scheme can accommodate decompression of headers from a range of $N^2$ sequence numbers. Additionally, the amount of storage space 804 allocated for storing uncompressed headers 806 can be greater than N, such as an integer multiple of N. In one embodiment, compressed packets 808 stored in the decompressor storage space 804 can be marked after a certain amount of time or after a certain number of other packets have been received and decompressed. A decompressor can discard the marked compressed packets 808 and/or request that the compressor re-transmit uncompressed versions of a marked packet. If there are multiple marked packets 808 having consecutive or neighboring sequence numbers, then in one embodiment, a compressor may need to only transmit one uncompressed header to serve as a reference header for decompressing all of the marked packets 808. Additionally, a marked packet that has been decompressed can be used to decompress other marked packets. The disclosed systems and methods for storing and decompressing packets are not limited to the sizes, dimensions, numbers, and components illustrated and/or described herein. Variations and/or modifications to the disclosed embodiments for storing and decompressing compressed packets are also contemplated.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices.

The computer program(s) can be implemented using one or more high level procedural or object-oriented programming languages to communicate with a computer system; however, the program(s) can be implemented in assembly or machine language, if desired. The language can be compiled or interpreted.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method to be practiced in a computing device disposed within a first node, said method comprising:
   receiving, in said first node, information regarding a particular packet stream prior to receiving packets from said packet stream;
   allocating, in said first node, storage space for storing uncompressed packet headers from said packet stream to maintain a history of said uncompressed headers;
   receiving, in said first node, an uncompressed packet including an uncompressed packet header forming a portion of said uncompressed packet and a packet data-segment forming the remaining portion of said uncompressed packet and identifying a packet stream associated with said packet;
   if said identified packet stream is said particular packet stream, determining whether said uncompressed packet header should be compressed prior to transmitting said uncompressed packet to a second node;
   if said uncompressed packet header should be compressed, obtaining a header-compressed packet by performing header compression on said uncompressed packet header in a manner that provides for packet re-ordering or packet loss.

2. The method of claim 1, further comprising:
   determining if said storage space is full and,
   if not, storing said uncompressed packet header in an available location in said storage space but,
   if so, discarding, from said storage space, a stored uncompressed packet header being oldest in said storage space and storing said uncompressed packet header in place of said discarded oldest uncompressed packet header;
   to maintain said history with most recent uncompressed packet headers.

3. The method of claim 2, further comprising:
   determining if all packets in said particular packet stream have been received by said first node and,
   if not, repeating all steps of claims 1 and 2 in the order provided, but,
   if so, terminating said method.

4. The method of claim 2, further comprising:
   if said packet header should not be compressed, transmitting said uncompressed packet including said uncompressed packet header from said first node to said second node to serve as a reference/starting point for decompressing in said second node subsequently-received compressed packet headers of other packets comprising said particular packet stream, while maintaining a history of said uncompressed packet header in said allocated storage space in said first node.

5. The method of claim 4 wherein said transmitted uncompressed packet header is associated with the first packet of said particular packet stream received by said first node.

6. The method of claim 5 wherein said transmitted first packet is also the first packet of a number of first-received packets within said particular packet stream initially-received by said first node, said number of said first-received packets remaining uncompressed for purposes of alternatively serving as said reference/starting point after said number of first-received packets are transmitted from said first node to said second node.

7. The method of claim 6 wherein said history of said most recent uncompressed packet headers including headers from said number of said first received packets is maintained in said allocated storage space in said first node after transmitting said first received packets to said second node.

8. The method of claim 4 wherein said transmitting is accomplished via a network.

9. The method of claim 8 wherein said network is the Internet.

10. The method of claim 1 wherein said uncompressed packet header includes a variable header portion and a static header portion, said manner that provides for said packet reordering or packet loss involving only said variable header portion.

11. The method of claim 10, wherein said manner comprises:
    if said identified packet stream is said particular packet stream, computing, for each said uncompressed packet header stored in said storage space in said first node, a corresponding delta-difference between said variable header portion of said uncompressed packet header and said variable header portion of another stored uncompressed packet header of a packet previously transmitted, after header compression, from said first node to said second node and immediately prior to transmitting a packet including a compressed version of said variable header portion of said uncompressed packet header.

12. The method of claim 11 wherein said corresponding delta difference is included with said compressed version prior to transmission from said first node to said second node, a restored uncompressed header equivalent to said uncompressed packet header being derived from said delta difference and said another stored uncompressed packet header in said second node.

13. The method of claim 11 further comprising:
determining if contents of headers in said particular packet stream varies at a rate of variation less than a particular rate and, if so, then compressing every other, or fewer than every other, said variable header portion stored in said storage space.

14. The method of claim 11 wherein computing said delta difference further comprises:
encoding said delta-difference using a sign-based code.

15. The method of claim 14 wherein said sign-based code is a twos complement.

16. The method of claim 14 wherein said encoding is based on frequency of occurrence of said variable header portions of said previously transmitted packet headers using a variable-length code.

17. The method of claim 16 wherein said variable-length code is a Huffman code.

18. The method of claim 1 wherein said information includes the specifying of order and type of networking protocol headers for packets in said particular packet stream.

19. The method of claim 1 wherein said allocated storage space maintains a history of N most recent uncompressed packet headers, where N is two or more and selected on a basis of average noise interference duration.

20. The method of claim 1 wherein a new uncompressed packet header is inserted into one end of a fully-populated said storage space while the oldest uncompressed packet header is discarded from the other end of said storage space, to eliminate need for storing sequence numbers of said uncompressed packet headers stored in said storage space in said first node since said uncompressed and stored packet headers remain in proper sequential order from newest to oldest in said storage space.

21. A method to be practiced in as computing device disposed within a destination node, said method comprising:
receiving, in said destination node from a source node, information regarding a particular packet stream prior to receiving packets from said packet stream;
allocating storage space for storing decompressed packet headers of previously-compressed packet headers of packets in said packet stream to maintain a history of said decompressed packet headers;
receiving, in said destination node, a packet including a packet header forming a portion of said packet and a packet data segment forming, the remaining portion of said packet and determining if said packet header is compressed and identifying a packet stream associated with said packet;
if said identified packet stream is said particular packet stream and if said packet header is compressed, determining if said compressed packet header can be decompressed; and
if said compressed packet header can be decompressed, then:
decompressing said compressed packet header to obtain a decompressed packet header, said decompressing using both a delta difference included in said compressed packet header and a particular decompressed header previously-stored in said storage space,
storing said decompressed packet header in said storage space, and
further decompressing any de-compressible compressed packet headers previously and temporarily stored in said destination node.

22. The method of claim 21, wherein:
if said compressed packet header cannot be decompressed, then:
temporarily storing said compressed packet header in said destination node until a subsequent compressed packet header is received and decompressed in said destination node which allows said temporarily-stored compressed header to be decompressed.

23. The method of claim 22 further comprising:
mitigating a situation in which said temporarily-stored compressed header and other temporarily-stored compressed headers cannot be decompressed by storing every other, or fewer than every other, said decompressed packet header in said decompressor storage space, to extend effective range of said storage space.

24. The method of claim 23 further comprising:
marking, after a certain amount of elapsed time, or after receipt of a certain number of other packets, said temporarily-stored compressed header for discard.

25. The method of claim 24 further comprising:
requesting retransmission of uncompressed versions of said discarded marked header.

26. The method of claim 21 further comprising:
if said identified packet stream is said particular packet stream and if said packet header is not compressed, updating said storage space using said not compressed packet header, but only if said not compressed packet header is more recent than at least one other uncompressed header in said storage space.

27. The method of claim 21 further comprising:
if said identified packet stream is said particular packet stream and if said packet header is compressed, examining said compressed header to identify other headers on which compression of said compressed header is based.

28. A node, comprising:
a packet header decompressor receiving information regarding a packet stream prior to receiving packets from said packet stream and configured to receive compressed packet headers associated with said packet stream via a network from a source node, said decompressor configured to decompress said compressed packet headers based on both a delta-difference included in each of said compressed packet headers and on previously-received, previously-decompressed and previously-stored packet headers to obtain delta-difference-decompressed packet headers, and further configured to store said delta-difference-decompressed packet headers with, or in place of one or more of said previously-stored packet headers; and
a packet header compressor receiving information regarding said packet stream nor to receiving packets from said packet stream and configured to transmit compressed versions of said delta-difference-decompressed packet headers associated with said packet stream via said network or another network to a destination node, said compressor configured to compress said delta-difference-decompressed packet headers into said compressed versions in a manner that provides for packet re-ordering or packet loss.

* * * * *